Jan. 1, 1924
J. T. JOHNSON
COMBINATION FAUCET
Filed Oct. 1, 1921
1,479,544
2 Sheets-Sheet 1
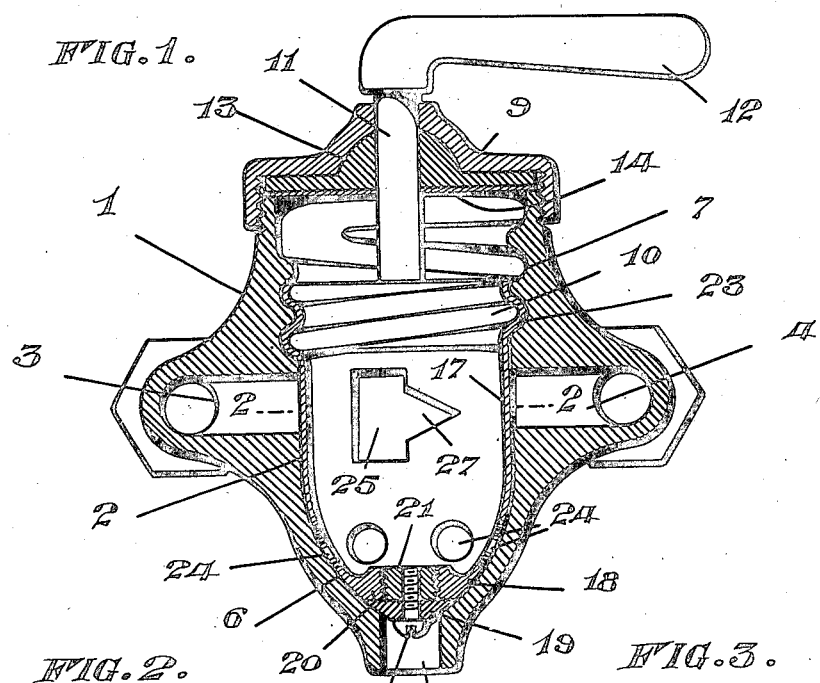
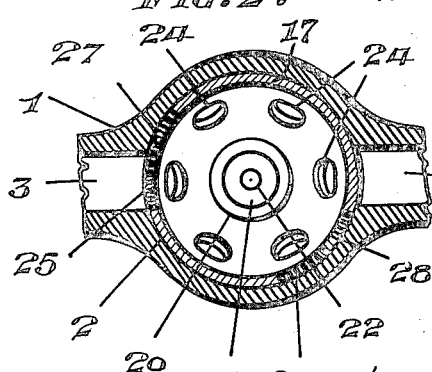
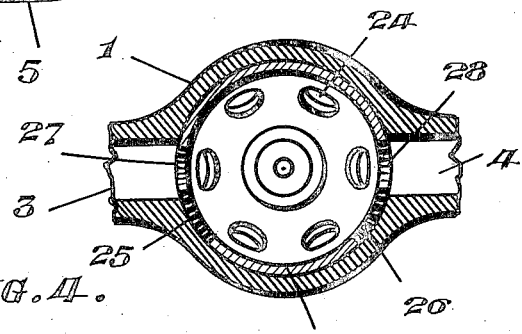
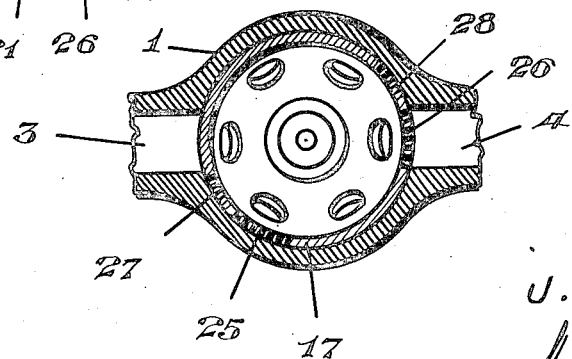
J. T. JOHNSON,
INVENTOR,
BY *Monroe E. Miller*
ATTORNEY.

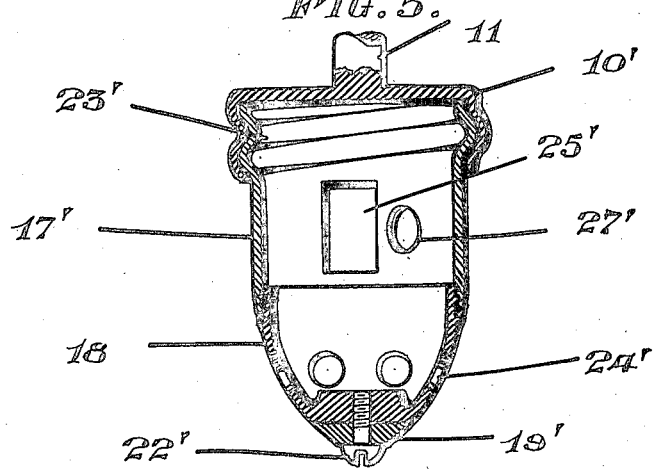
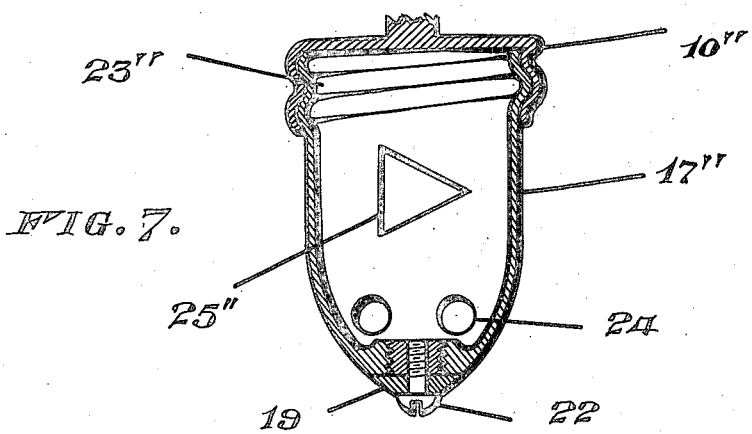
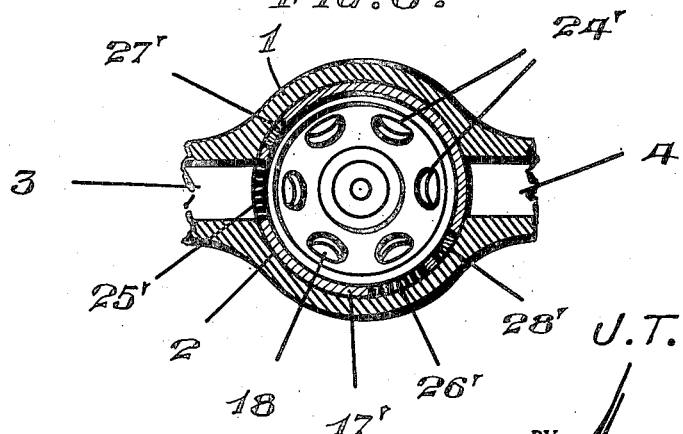

Patented Jan. 1, 1924.

1,479,544

UNITED STATES PATENT OFFICE.

JACOB T. JOHNSON, OF ATLANTA, GEORGIA.

COMBINATION FAUCET.

Application filed October 1, 1921. Serial No. 504,584.

*To all whom it may concern:*

Be it known that I, JACOB T. JOHNSON, a citizen of the United States, residing at Atlanta, in the county of Fulton and State of Georgia, have invented certain new and useful Improvements in Combination Faucets, of which the following is a specification, reference being had therein to the accompanying drawing.

The present invention relates to valves and faucets, and more especially to combination hot and cold water fixtures, such as are used in bath tubs, shower devices, washstands, sinks, barber shops, and the like, this invention being a variation of the combination faucet disclosed in my Patent No. 1,336,236 granted April 6, 1920.

It is the object of the invention to provide a combination hot and cold water faucet using a single handle for controlling the discharge of either hot or cold water separately or a mixture thereof, and having a valve member of novel form and construction, which is simple and inexpensive to manufacture, and efficient in use, as well as providing for advantages in the use thereof.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein—

Figure 1 is a vertical section of the faucet, portions being shown in elevation, and the valve member being in closed position.

Fig. 2 is a horizontal section on the line 2—2 of Fig. 1 showing the valve member turned to start the flow of hot water.

Fig. 3 is a sectional view similar to Fig. 2 showing the valve member turned to establish the flow of both hot and cold water.

Fig. 4 is a similar section showing the valve member turned further for the flow of cold water only.

Fig. 5 is a diametrical section of a modified form of valve member.

Fig. 6 is a section similar to Fig. 2 showing the use of the modified form of valve member.

Fig. 7 is a diametrical section of a further variation in the construction of the valve member.

Generally considered, the present faucet is of about the same construction and operation as that shown in my patent hereinbefore referred to, and the body or casing 1 is of suitable metal and has a vertical chamber 2 and hot and cold water inlet passages 3 and 4, respectively, leading to diametrically opposite sides of a smooth cylindrical wall of the chamber 2, the casing having suitable means for the connection of the cold and hot water supply pipes. The lower end of the casing terminates in a discharge nipple or nozzle 5, and the lower end of the chamber 2 is gradually reduced in diameter or tapered to provide the conoidal valve seat 6. The wall of the chamber thus converges and merges into the nozzle 5. The chamber 2 is internally screw-threaded, as at 7, at a point spaced above the passages 3 and 4, and the upper end of the chamber 2 is closed by a cap 9 threaded on the upper end of the casing.

The valve member includes a metal shell 17 snugly fitting the smooth cylindrical wall of the chamber 2 across the discharge ends of the passages 3 and 4, and the upper end portion of said shell is formed with an exterior and interior screw-threaded portion 23 into which a cap or plug member 10 is threaded to close the upper end of the shell and to constitute a part of the valve member which is rotatable in the casing. The threaded portion 23 of the shell is screw-threaded within the threaded portion 7 of the casing, whereby the valve member is threaded within the casing at that side of the passages 3 and 4 opposite to the outlet. The shell 17 and cap or plug 10 are secured together frictionally or in any other suitable manner, whereby the shell 17 turns with said cap 10.

The cap 10 has a stem 11 projecting upwardly axially of the valve member through the cap 9 and provided at its outer protruding end with a suitable handle 12 for turning the valve member. Suitable packing 13 is disposed within the cap 9 to prevent leakage, and a disk 14 is disposed between said packing and the upper end of the casing 1 to retain the packing place.

The lower end portion of the shell 17 is gradually reduced in diameter or tapered to provide a lower finger portion 18 of conoidal form to seat snugly in the seat of the casing. The portion of the shell 17 above the portion 6 corresponds to the portion 17 of the valve member disclosed in my prior patent hereinbefore referred to, and the lower conoidal or tapered portion 18 of the shell 17 corresponds to the finger of said patented faucet. A valve tip 19 of rubber, leather or other suitable material is secured to the lower end of the valve member, and conforms to the conoidal form of the lower terminal portion of the valve member, to seat on the seat 6 directly over and around the outlet. As shown, the shell 17 is spun from sheet metal, or can be otherwise made, and is provided at its lower reduced terminal with an annular abutment 20 into which a plug 21 is screw-threaded or otherwise secured, and the valve tip or washer 19 bears against said abutment 20 and plug 21, and a screw 22 or other securing element extends through the valve tip and is threaded or secured within the plug 21. When the handle 12 is turned to screw the valve member down on the seat 6, the valve tip 19 in being compressed over the outlet, will prevent the escape of water, assisted by the seating of the conoidal or tapered portion 18 on the seat 6.

The conoidal portion 18 of the valve member shell has outlet openings or ports 24 which are normally closed by the seat 6 when the valve member is down, and through which the water can flow from within the shell 17 between the portion 18 of the valve member and seat 6 to the outlet nozzle 5 when the valve member is raised.

The shell 17 is provided with means for controlling the flow of water from the passages 3 and 4 into the shell, and, for this purpose, the shell 17 has the hot and cold water openings or ports 25 and 26, respectively, adapted to register alternately with the passages 3 and 4. The shell 17 also has the secondary diametrically opposite inlet openings or slots 27 and 28 extending laterally from the respective openings 25 and 26 toward one another to register simultaneously with the respective passages 3 and 4. The secondary openings or extension slots 27 and 28 are tapered or reduced in width from the openings 25 and 26, respectively, for graduating the flow of water. The shell or apron 17 which depends from the cap or member 10 is thus of arcuate section where it extends across the passages 3 and 4, and snugly fits the smooth cylindrical wall of the chamber 2, while the lower terminal or finger portion of the valve member is seatable on the lower end of the chamber.

In using the faucet, when the handle 12 is turned to screw the valve member down tight, not only does the shell 17 extend across and close the passages 3 and 4, but the portion 18 of the shell and valve tip 19 seat on the seat 6 to prevent the passage of the water down through the openings 24 and outlet nozzle 5. A compression fit is thus provided between the valve member and casing, and the openings or ports 25, 26, 27 and 28 are out of registration with the passages 3 and 4, to completely shut off the flow of water. When the valve member is turned (counter clock-wise as seen in Figs. 2, 3 and 4) the hot water opening or slot 25 will first come into rgeistration with the hot water passage 3, so that the hot water can flow through said opening 25 into the shell 17, as seen in Fig. 2. At the same time, the rotation of the valve member will result in it being screwed upwardly, to remove the portion 18 and valve tip 19 from the seat 6, so that the water entering the shell can flow through the openings 24 in between the lower end of the shell and the valve seat and through the outlet. By turning the valve member further, the flow of hot water is increased, and when the valve member is turned still further to intermediate position, the reduced openings or ports 27 and 28 are both brought into registration with the passages 3 and 4, respectively, as seen in Fig. 3. This will establish both the flow of hot and cold water into the shell and out through the outlet. By turning the valve member one way or the other, the flow of hot and cold water can be controlled to regulate the temperature of the water discharged, and a slight movement in either direction will vary the mixture of the hot and cold water, to avoid the objectionable manipulation of several valves or a prolonged operation of one valve. When the valve member is turned still further in the same direction as when opening the faucet, the openings 25 and 27 are both moved out of registration with the passage 3, and the opening 28 is also moved out of registration with the passage 4, thereby bringing the cold water opening or slot 26 into registration with the passage 4, as seen in Fig. 4, so that only cold water flows into and through the shell 17. The flow of cold water can be regulated by changing the position of the valve member, the same as the flow of hot water only can be varied by turning the valve member slightly when in the position as seen in Fig. 2. By turning the valve member in the opposite direction, the openings or ports are moved past the passages in the reverse manner, and the valve member is screwed down on its seat to shut off the flow of water. The openings of the valve member are also moved out of registration with the hot and cold water inlet passages, and such openings are closed by the smooth wall of the chamber 2.

If desired, the passage 4 can be used for the supply of hot instead of cold water, and the passage 3 for the supply of cold water, so that cold water will be delivered first, then a mixture of hot and cold water and finally hot water only, when turning the valve member to establish the flow of water.

With the present arrangement, the mixture of hot and cold water can not only be regulated, but also the supply of either hot or cold water. The reduced secondary or mixing openings 27 and 28 also restrict the flow of hot and cold water to avoid an excessive flow of water into the shell 17 faster than it can run out and the possible backing up of one stream by the other when the pressures are different.

In the modified form as shown in Figs. 5 and 6, the upper threaded portion 23' of the shell 17' is screw-threaded within the screw-threaded rim of the cap 10' which has the valve stem 11', and said cap, instead of the threaded portion 23', is screw-threaded within the casing. A tapered or conoidal finger portion or section 18' made separate from the shell 17' is also used, having its larger end or rim screw-threaded into or otherwise secured to the lower end of the shell 17', and the tip 19' is secured to the apex of said finger portion or section 18'. The shell 17' has the main openings 25' and 26' to register alternately with the passages 3 and 4, and the smaller secondary openings or ports 27' and 28' located at the same sides of said main openings 25' and 26' to register at the same time with the passages 3 and 4, similar to the secondary openings or slots 27 and 28 above described.

In the variation shown in Fig. 7, the shell 17'' is about the same as the shell 17, excepting that the upper threaded portion 23'' thereof is threaded with the cap 10'', the same as shown in Fig. 5 and the openings of the shell 17'' are of triangular form, as at 25'', to accomplish the flow of hot and cold water and the regulation or graduation thereof in substantially the same manner as with the openings hereinbefore described.

Having thus described the invention, what is claimed as new is:—

1. A faucet comprising a casing having a chamber, a pair of inlet passages leading to said chamber, and a valve seat and discharge outlet at one end of said chamber, and a valve member movable rotatably and longitudinally within said chamber including a shell fitting the wall of said chamber and having inlet openings to register with said passages for controlling the flow from either or both passages into the shell, said shell having a portion to bear on said seat over the outlet and having apertures surrounding said portion for the flow from within the shell to the space between the shell and seat when the valve member is moved away from said seat.

2. A faucet comprising a casing having a chamber, a pair of inlet passages leading to said chamber, and a valve seat and a discharge outlet at one end of said chamber, and a valve member fitted in said chamber for rotary and longitudinal movements and including a shell fitting the wall of the chamber and provided with inlet openings to register with said passages for controlling the flow from either or both passages into the shell, said seat being tapered to said outlet, the shell having a tapered portion to fit said seat and a tip to seat over the outlet, said tapered portion of the shell having an outlet opening for the flow from within the shell between said tapered portion thereof and seat.

3. A faucet comprising a casing having a chamber with a smooth cylindrical wall, a pair of inlet passages leading to said chamber and a discharge outlet at one end of the chamber, said wall having screw threads at that side of the inlet passages opposite to the discharge outlet and spaced from said passages, and a valve member screw threaded within said screw threaded portion of the wall and including a shell snugly fitting said smooth cylindrical wall and provided with inlet openings to register with said passages for controlling the flow therefrom into the shell, said shell having a portion to seat against the end of the chamber over said outlet, and the shell having openings surrounding said portion for the flow from within the shell to the space between the shell and said end of the chamber when the valve member is moved away from the outlet.

4. A faucet comprising a casing having a chamber with a smooth cylindrical wall, a pair of inlet passages leading to said chamber, a discharge outlet at one end of said chamber and a tapered valve seat at said end of the chamber merging from said wall into said outlet, said wall having screw threads at that side of said inlet passages opposite to said outlet and spaced from said passages, and a valve member screw threaded within said screw threaded portion of the wall and having a shell snugly fitting said smooth cylindrical wall and provided with inlet openings to register with said passages for controlling the flow therefrom into the shell, the shell having a tapered portion to fit said seat and provided with an outlet opening to be closed by said seat and permitting the flow from within the shell between said tapered portion of the shell and seat when the valve member is removed from the seat, and said valve member having a tip at the apex of said tapered portion to bear on said seat over the discharge outlet.

In testimony whereof I hereunto affix my signature.

JACOB T. JOHNSON.